Figure 1:
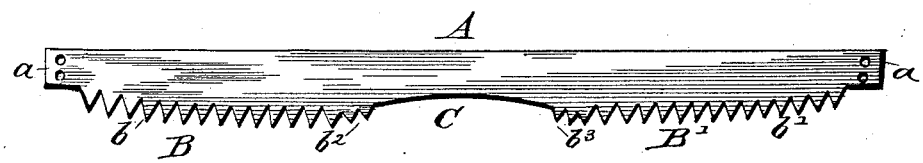

(No Model.)

J. J. PARKER.
SAW.

No. 336,739.      Patented Feb. 23, 1886.

WITNESSES      INVENTOR

Phil C. Dieterich.      John J. Parker
J. C. Lathrop      By H. Clay Tuttle
     Attorney

# UNITED STATES PATENT OFFICE.

JOHN J. PARKER, OF AITKIN, ASSIGNOR TO WILLIAM F. EDLEBROCK, OF ST. CLOUD, MINNESOTA.

SAW.

SPECIFICATION forming part of Letters Patent No. 336,739, dated February 23, 1886.

Application filed November 28, 1885. Serial No. 184,164. (No model.)

*To all whom it may concern:*

Be it known that I, JOHN J. PARKER, a citizen of the United States, residing at Aitkin, in the county of Aitkin and State of Minnesota, have invented certain new and useful Improvements in Crosscut-Saws; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to crosscut or drag saws; and the novelty consists in the peculiar construction, arrangement, and adaptation of parts, as will be more fully hereinafter set forth, and specifically pointed out in the claims.

The device is especially adapted for sawing large timber. In some parts of the country it is desirable to saw logs of five, six, or seven feet diameter, and, notably upon the Pacific slope, even larger logs are met with. In sawing this large lumber ordinary saws having teeth along their entire cutting-edges are objectionable, for the reason that it is not convenient or possible to give to the saw a stroke in each direction equal to the distance through the lumber, and, as a consequence of a shorter stroke, some of the teeth near the middle of the saw will not pass out of the kerf and will not clear themselves of the dust. The teeth thus accumulating dust serve to elevate the saw and prevent its proper working, or clog the saw and prevent its working by choking it in the kerf.

This invention belongs to that class of crosscut-saws which are ordinarily operated by two workmen—one at either end. It is almost impossible to give to the saw, under such conditions, a stroke greater than three and a half feet or four feet. If, then, the diameter of the log is six feet, the saw will not clear itself by just so much as the diameter of the log is greater than the length of the stroke given to the saw. I provide for overcoming this difficulty and make it convenient to saw a six-foot log with a stroke but slightly in excess of three feet.

To this end my invention consists, essentially, in a crosscut-saw having two operating-sections separated by an inoperative section, the latter being located along the center of the saw. I utilize this central portion, which is inoperative in the ordinary process of sawing, as a means for starting the saw and properly finishing the kerf at the last of the kerf.

With this general statement of invention, I refer to the drawings which accompany this specification and form a part thereof, and in which—

Figure 2:
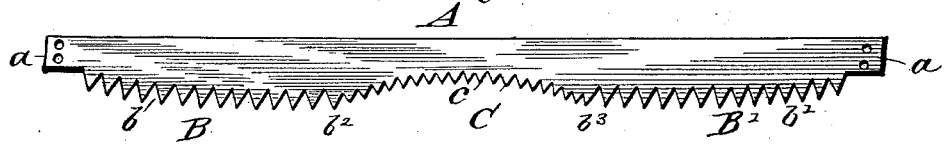
Figure 3:
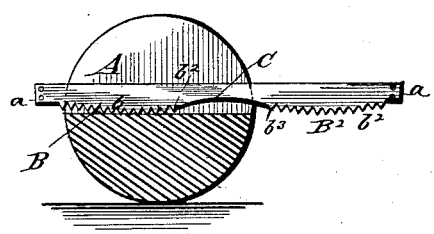
Figure 4:
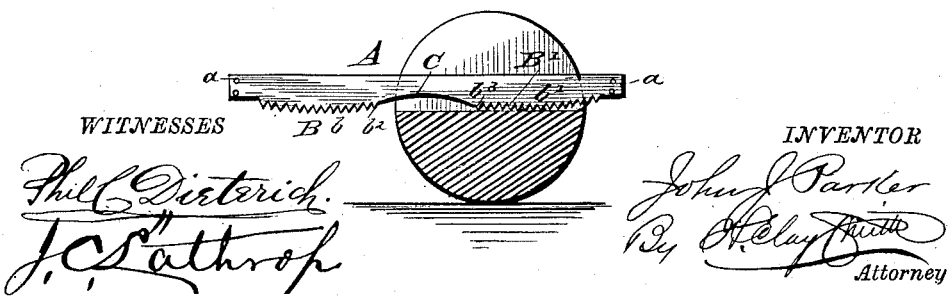

Figure 1 is a side elevation of my improved saw. Fig. 2 is a similar view showing a modification. Fig. 3 is a view on a smaller scale, showing the position of the saw at the end of a stroke in one direction; and Fig. 4 is a similar view showing the position of the saw relatively to the log at the end of a stroke in the opposite direction.

Referring to said drawings, A designates the body or blade of the saw, having handle-sockets $a$ or other power attachments.

The cutting-edge of the saw is divided into two working-sections, B and B', having teeth $b$ and $b'$, respectively.

As thus far described, the saw may be of any approved and known construction.

Along the central portion of the saw is a cut-away place, C, which entirely separates one cutting-section, B or B', from the other.

It is difficult to start the saw at times, the large teeth making the saw liable to jump from one position to another. The size of the teeth often precludes, also, a clean cut at the last of the kerf. I provide the cut-away portion C with a series of smaller teeth, $c$, which not only serve efficiently to start the saw, but they allow the cut to be finished with a clean kerf entirely through the timber. The part C is not operative in the ordinary process of log or lumber sawing.

Each of the operative parts B and B' is to be thrown in the proper direction to carry the inner teeth, $b^2$ or $b^3$, more or less past the center of the log. Then upon the return movement, if the said teeth $b^2$ or $b^3$ are drawn out from the kerf, all the teeth clear themselves of dust. I illustrate this in Figs. 3 and 4. In Fig. 3 the inner tooth $b^2$ of the part B has passed slightly beyond the center of the log D, and the inner tooth $b^3$ of the cutting part B' is clear of the kerf and it will readily clear itself of its accumulated dust. In this view the saw is at the end of its stroke to the right. In Fig. 4 a reverse order accrues, and the saw is at the end of its opposite stroke to the left. These features being understood, it will readily be seen that a saw with a space, C, of, say, three feet in length, will by a stroke of a little more than three feet successfully cut and sever a log of six feet diameter, and it will also be seen that with an ordinary saw this would be impossible.

In details of construction and arrangement modifications may be made within wide limits. I may omit the teeth c.

I do not limit myself to any particular size or length of saw, nor is the length of the space C of importance, as these features may differ with different kinds of service to be performed.

What I claim as new is—

1. A drag-saw having its cutting-edge provided with a non-cutting or cut-away portion, said portion being arranged in the center of the saw, and of a continuous length approximating one-fourth the length of the saw, serving to separate the cutting portions B′ B, for the purpose set forth.

2. A drag-saw having the central portion of its cutting-edge for a distance approximating one-fourth the length of the saw cut away and inoperative, as set forth.

3. A crosscut or drag saw having operating or cutting portions B B′ and an intervening cut-away portion, C, the latter being of a length approximating one-fourth that of the blade, and provided with saw-teeth of smaller size, the whole arranged and adapted to operate as and for the purposes set forth.

In testimony whereof I affix my signature in presence of two witnesses.

JOHN J. PARKER.

Witnesses:
SAML. S. LUTHER,
F. P. McQUILLIN.